US006178489B1

(12) United States Patent
Singh

(10) Patent No.: US 6,178,489 B1
(45) Date of Patent: Jan. 23, 2001

(54) METHOD AND APPARATUS FOR MANAGING LINEAR ADDRESS MAPPED STORAGE UNDER SELECTIVE COMPRESSION AND REGENCY OF USAGE CONSTRAINTS

(75) Inventor: Shanker Singh, Morgan Hill, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/093,711

(22) Filed: Jun. 8, 1998

(51) Int. Cl.[7] ....................................................... G06F 12/00
(52) U.S. Cl. .......................... 711/173; 711/170; 711/171; 711/172; 710/68
(58) Field of Search ............................... 710/68; 711/170, 711/171, 172, 173, 112, 114, 104, 4, 105; 395/114; 707/205, 207

(56) References Cited

U.S. PATENT DOCUMENTS

| | | | |
|---|---|---|---|
| 4,464,650 | 8/1984 | Eastman et al. ........................ 341/51 |
| 5,237,460 | * 8/1993 | Miller et al. ............................. 360/8 |
| 5,237,675 | * 8/1993 | Hannon, Jr. ............................ 395/425 |
| 5,247,638 | * 9/1993 | O'Brien et al. ....................... 395/425 |
| 5,305,295 | * 4/1994 | Chu ........................................ 395/425 |
| 5,627,995 | * 5/1997 | Miller et al. ...................... 395/497.02 |
| 5,666,114 | 9/1997 | Brodie et al. ........................... 341/50 |
| 5,710,909 | * 1/1998 | Brown et al. ..................... 395/497.01 |
| 5,812,817 | * 9/1998 | Hovis et al. ...................... 395/497.04 |
| 5,901,277 | * 5/1999 | Chu et al. .............................. 395/114 |
| 5,991,775 | * 11/1999 | Beardsley ............................. 707/205 |
| 6,000,009 | * 12/1999 | Brady ..................................... 711/171 |
| 6,032,161 | * 2/2000 | Fuller et al. .......................... 707/205 |

* cited by examiner

*Primary Examiner*—Eddie P. Chan
*Assistant Examiner*—Kimberly McLean
(74) *Attorney, Agent, or Firm*—Esther E. Klein; Randall J. Bluestone; Felsman, Bradley, Vaden, Gunter & Dillon, LLP

(57) ABSTRACT

A method and apparatus for managing update writing in place in linear address space mapped memories. This is attained by partitioning the memory into compressed and uncompressed areas, estimating the percent of compressible images of fixed-length symbol strings recordable into the image locations, revising the estimate upward or downward as a function of the persistency of runs of writes to one area or the other, and adjusting the relative number of locations in the areas proportionally to the revised estimate.

15 Claims, 3 Drawing Sheets

COMPRESSION MANAGEMENT APPLIED IN
A HIERARCHICAL STORAGE EMBODIMENT

STORAGE SUBSYSTEM AND DATA PATHS FOR RESIZING
AND REWRITING DASD-BASED ADDRESS SPACES

COMPRESSION MANAGEMENT APPLIED IN
A HIERARCHICAL STORAGE EMBODIMENT

METHOD AND APPARATUS FOR MANAGING LINEAR ADDRESS MAPPED STORAGE UNDER SELECTIVE COMPRESSION AND REGENCY OF USAGE CONSTRAINTS

FIELD OF THE INVENTION

This invention relates to storage devices such as disk drives and to LRU or LFU organized storage subsystems. More particularly, this invention relates to managing writes in place and their updates of fixed-length symbol strings under selective compression and recency of usage constraints at either the linear address-mapped storage device or subsystem level.

DESCRIPTION OF THE RELATED ART

As used in the specification, the terms "data string" or "symbol string" are used synonymously. Also, an uncompressed data or symbol string comprises a fixed number of symbols. Relatedly, the terms "data strings", "page", "unit of work", and "unit of storage" are likewise used synonymously. Furthermore, a disk drive is defined as a cyclic, multitracked storage device and is synonymously known as a direct access storage device or DASD. Lastly, a nominal compression ratio is an average compression ratio value associated with a given compression facility or device. An effective compression ratio is usually a lesser value than the nominal ratio and is applied as a compression measure to storage devices and subsystems.

Aspect of Compression

The term "compression" refers to a series of operations to reduce the number of symbols representing a fixed-length string of data. The compression may be lossless or lossy. Lossless compression enables recapture of the original symbol strings from their compressed image, while lossy compression means that some portion of the original symbol string cannot be recovered from the compressed version. While ultimately all forms of compression are founded upon a statistical characterization of an information source, practical compression utilizes either dictionary-based techniques or statistically-based techniques.

Dictionary-based techniques utilize a pointer to a word in a dictionary or codebook, the length of the pointer to the word being shorter than the word itself. In contrast, statistical compression substitutes codewords for the original symbols or symbol string. In the statistical case, length of the substitute codewords is inverse to the frequency of occurrence of the source symbols or symbol sequence from the source alphabet or language.

Typically, symbol strings may represent alphanumerically-coded text or raster-scanned image data. Alphanumerically-coded or text data usually is expected to be lossless since the information may not be elsewhere repeated for recovery purposes. However, raster-scanned image or voice data contains significant redundancy. Thus, in the case of image data, one or more datapoint losses could be recovered from the uncompressed image by signal scaling, averaging, or other techniques. A simple illustration is the difference exemplified between an error in a bank account and a slight blemish in a photograph or a weather map.

It is also well appreciated that prior art compression methods shorten alphanumeric or text data strings into a range from 1.5/1 to 4.0/1, while raster-scanned or image data is more highly compressible frequently up to 10/1 to 15/1. One form of irreversible compression, also called "compaction", involves removing space or other syntactical characters between groups of text characters. It would not be unusual for an uncompressed symbol string to achieve a 4/1 compressed image by first compacting the symbol string and then compression encoding it.

Global Data Compression Characteristics

Compression is to be found in communications and storage applications because of their economies of scale. However, the high capital costs of communications and storage facilities require simplicity in design and operation. This has led to storage systems being tuned to conservative compression ratios of expected text and image usages. Thus, any general compression coding is more likely to achieve a compression ratio of 2/1 or 3/1 than 10/1 or 15/1.

The choice of a nominal compression ratio is discussed in Brodie et al., U.S. Pat. No. 5,666,114, "Method and Means for Managing Linear Mapped Address Spaces Storing Compressed Data at the Storage Subsystem Control Unit or Device Level", issued Sep. 9, 1997. The essential point is that the symbol probability distributions, even for a first order approximation for English text, may be characterized as Gaussian or Laplacian and skewed or peaked to the left. When this distribution is superimposed on an ordered set of compression ratios, as in FIG. 2 of the Brodie '114 patent, the distribution peak nominally falls in the 1.5/1 to 4/1 compression range.

Unpredictability of Compression Effects on Storage Performance

Clearly, compression increases the storage capacity of any memory device such as a buffer, cache, or disk-backing store. Also, it is clear that memory and storage accessing and management are enhanced when the units of storage are fixed and uniform. However, compression operations map fixed-length strings into variable-length strings. Furthermore, some of the strings, pages, blocks, records, or tracks are expected to be write modified or updated. This means that the compressed images of changed symbol strings may change in length. They may even expand under compression. Indeed, it has been the unpredictability of the length of the compressed image, especially when a modified symbol string has been recompressed, that has daunted the use of compression in disk-based storage.

Storage Management and Hierarchical Storage

Storage subsystems comprise an alterable storage medium, an accessing mechanism, and an addressing protocol. Uncompressed data is either written to an address in a storage model mapped onto the subsystem or is read from an address in the storage subsystem. The subsystem manages all aspects of data storage within its boundary. This includes managing the storage model, accessing operations such as address conversions, transducer positioning, data compression and decompression, and error detection and correction.

CPUs send read and write requests to storage subsystems in either random or sequential patterns. These patterns influence the storage subsystem design. Random referencing assumes that the largest fraction of repeat referencing requests will be made to a small percentage of clusterable data. This is termed "locality of referencing". Based on the locality assumption, subsystems include a high-speed electronic random access memory or "front store" for storing a fraction of either the most recently used (MRU) or the most frequently used (MFU) data strings. The front store is coupled to a very large capacity but substantially slower speed "backing store".

The larger storage subsystems maintain separately-tuned paths for read and write requests. In this regard, update writes are written out from the front store to a nonvolatile store (NVS) while the storage subsystem sends a write complete signal to the CPU. This permits the storage subsystem to record the update writes on the backing store asynchronously. However, a choice must be made whether to write out the changes on an update in place or on a scatter write basis. Updating in place preserves the locality of reference for future accessing purposes, while scatter writing assists the speed with which updates can be recorded on the backing store.

Compression Management in Linear Address Mapped Storage

The aforementioned Brodie et al. '114 patent is directed to managing a fixed-size storage facility under compression ordinarily accessed as a linear-mapped, addressable space. Brodie seeks to control the compression and recompression length variability and to preserve locality of referencing in the presence of update writes. First, he partitions the storage facility into a linear addressable space for compressed symbol string images and a linked list addressable space for overflow portions of each compressed image. The linear addressable space includes a plurality of fixed equal-size locations. Second, a token to the overflow portion is embedded in the linear address. The system dynamically manages space by periodically readjusting the percentage of space allocated between the linearly addressable and linked list addressable regions.

As mentioned, Brodie periodically readjusts the linear space in a direction so as to maintain the amount of overflow space to lie within a predetermined range. That is, the number of overflow locations is a calculated percentage of the number of compressed symbol string locations in the linear space. If the compression ratio is too low, the result is that a larger number of compressed symbol strings will not fit in the linear space locations and the number of overflow references will increase.

The system responds by increasing the nominal compression ratio and hence rewriting the linear space with a larger number of smaller size locations such that the number of overflow locations in the linked list space is kept at a constant percentage of the number of locations in the linear space. Conversely, if the compression ratio is too high, the system responds by decreasing the ratio and rewriting the linear space with a smaller number of larger-size locations. Unfortunately, Brodie requires that only compressed images can be written into or from the storage facility, and the adjustments in maintaining maximum storage are made by varying the nominal compression ratio when the storage facility is periodically rewritten.

SUMMARY OF THE INVENTION

It is accordingly an object of this invention to devise a method and apparatus for managing writes in place and their updates of fixed-length symbol strings under selective compression and recency of usage constraints at either the linear address mapped storage device or subsystem level.

It is another object that such method and apparatus be adaptive and access a storage device or subsystem without changing the nominal compression ratio.

It is a related object that the method and apparatus of this invention be operable whether the linear addresses are mapped onto single devices such as random access memories, DASDs, or hierarchical storage subsystems operating under a recency of usage or a frequency of usage constraint.

The foregoing objects are believed satisfied by a method and apparatus in which a linear address mapped memory or storage device is partitioned into compressed and uncompressed areas. As each fixed-length symbol string is applied to the memory or device, its compressible image value and length are determined. At this point, either the compressed image of the symbol string is written into a location in the compressed area if it fits into a standard short length, or the symbol string itself is written to a location in the uncompressed area. When the symbol string is written out, a token is embedded in the compressed area pointing to its location in the uncompressed area.

In the method and apparatus of this invention, the nominal compression ratio remains constant. However, an estimate is made of the percentage of compressible images that are recordable into the image locations. In this regard, the relative number of addressable locations in the compressed and uncompressed areas is set proportional to this estimate. The estimate is periodically revised by a predetermined amount upward or downward as a function of the persistency of runs of writes of the symbol strings to one area or the other. For a bounded space, the relative numbers of locations are then proportionally readjusted. This method permits compression storage management to be simplified and enhanced against a slightly lower effective compression ratio.

Illustratively, if a storage device has a capacity of 10,000 uncompressed data bytes recorded in the form of 20-byte symbol strings and if it were operated under a nominal compression ratio r of 4/1, then it could maximally store 40,000 compressed data bytes. This would mean that each 20-byte symbol string would be compressed into a 5-byte image on the average.

Suppose it was estimated that 90 percent of the symbol strings could be compressed into images of five bytes or less. This would mean that the effective storage capacity would be (10,000/0.25)0.9+(10,000)0.1=37,000 bytes at an effective compression ratio of 3.7/1. Based upon this assessment, the number of addresses $N_1$ assigned to compression images would be [(10,000/0.25)0.9]/5=7200 locations of five bytes in length each. Relatedly, the number of addresses $N_2$ assigned to the uncompressed symbol strings or their updates is [(10,000)0.1]/20=50 locations of 20 bytes each.

Further suppose a revised estimate was made such that only 80 percent of the symbol strings could be compressed into images of five bytes or less and the storage device would have to be rewritten (reformatted). First, its effective storage capacity would be (10,000/0.25)0.8+(10,000)0.2= 34,000 bytes at an effective compression ratio of 3.4/1. The number of addresses $N_1$ assigned to a compression image would be [(10,000/0.25)0.8]/5=6400 locations, while the number of addresses $N_2$ assigned to the symbol strings or their updates would be [(10,000)0.2]/20=100 locations.

Lastly, suppose an estimate was made that only 60 percent of the symbol strings could be compressed into images of five bytes or less. Effective storage capacity would be (10,000/0.25)0.6+(10,000)0.4=28,000 bytes and an effective compression ratio of 2.8/1. The number of compression image addresses $N_1$ would be [(10,000/0.25)0.6]/5=4800 locations. The number of addresses $N_2$ would be assigned to symbol strings and their updates with the [(10,000)0.4]/20= 200 locations.

Advantageously using the method of the invention, all accesses to the storage device are made using a linear address domain. Furthermore, only a modest change need be made in increasing or decreasing the relative number of locations in order to conform to any changed estimate. It is noted that only the effective compression ratio changes and no alteration need be made to the compression facility.

The method and apparatus of this invention can be employed in a hierarchical storage system of the front store/back store type. In this regard, both the front store and the back store are partitioned into compressed and uncompressed areas. In this configuration, uncompressed symbol strings and their updates are written into an uncompressed area of the front store. A symbol string is destaged from the front store under an LRU discipline into a compressed area of the front store and a compressed area of the back store only if its compressed image fits. If the image does not fit, then the symbol string is written into an uncompressed area of the back store. Similarly, compressed images written into the counterpart area of the front store are destaged under an LRU discipline and written into a bit bucket and lost. In the context of a storage subsystem, the back is partitioned into two areas as described above, and includes the use of tokens as pointers.

DESCRIPTION OF THE PREFERRED EMBODIMENT

Figure 1:
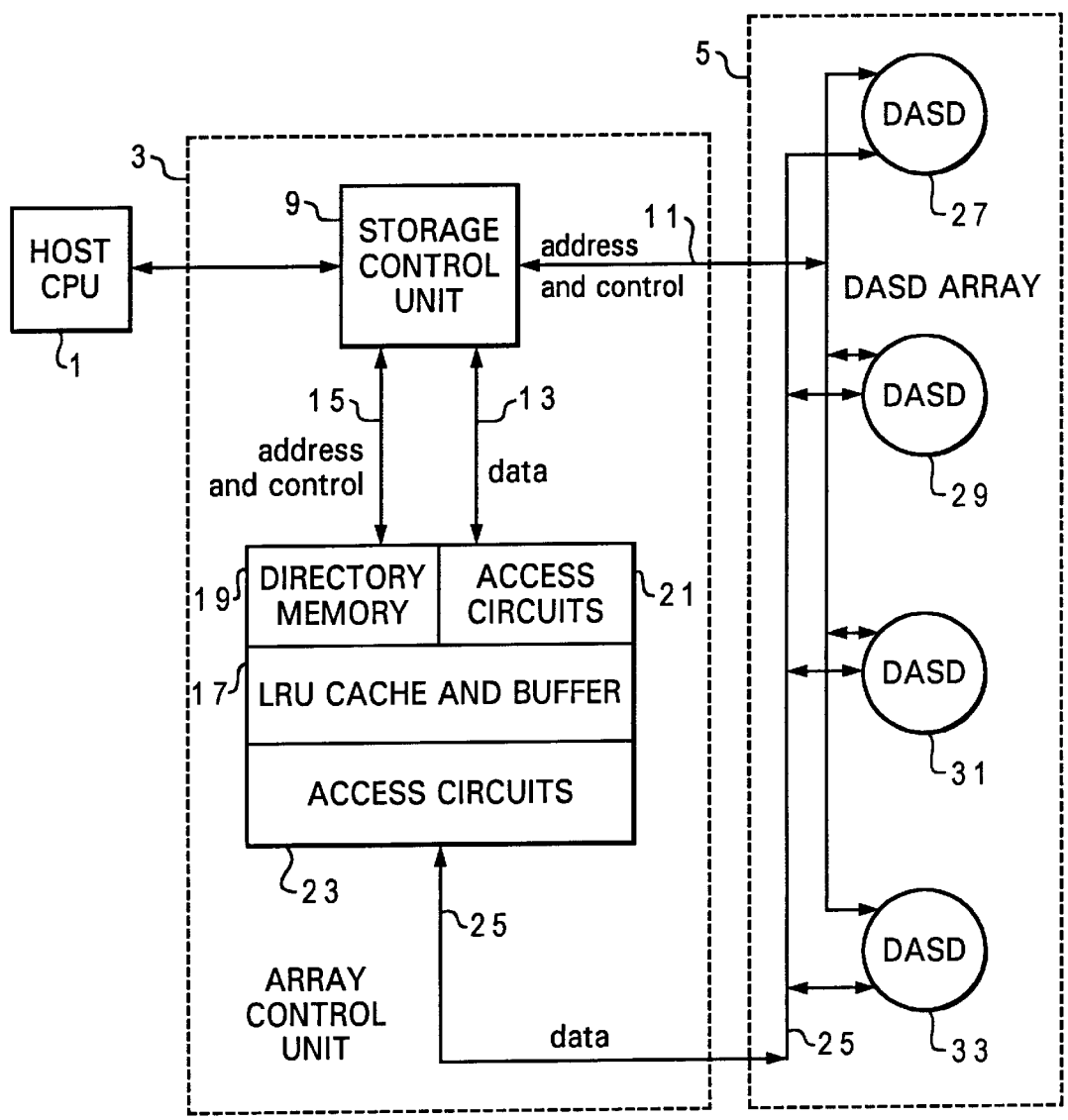
FIG. 1 shows a storage subsystem and data paths for resizing and rewriting DASD-based address spaces according to the prior art.

Referring now to FIG. 1, there are shown a storage subsystem and data paths for resizing and rewriting DASD-based address spaces as typically found in the prior art. In this system, CPU 1 sends read or write requests to an array control unit 3. The array control unit interprets each request by accessing a local directory 19 for the location of the symbol string or update of interest. If a symbol string is present in the LRU cache or buffer 17, it is either staged to the requesting CPU 1 responsive to a read request, or in the case of a write request is asynchronously copied out to the DASDs under an appropriate RAID array discipline. Replies to read or write requests not available in the LRU cache 17 are staged up from the array 5 to the LRU cache 17.

The storage control unit 9 and each of the DASDs 27–33 include one or more processors for periodically rewriting and reformatting the recording media of their respective arrays or disk drives. Such rewriting or reformatting of the same medium or of a spare or standby occurs responsive to a detected error or erasure of all or some large portion of the media or upon an ascertained failure of the media. It also occurs where the subsystem is itself adjusting to a change in one or more of the attributes of storage, such as the compression statistics of the symbol strings written and rewritten to the subsystem and associated storage devices. In this regard, the Brodie '114 patent describes such a self-adjusting method and means with reference to a disk storage device. He includes a software protocol for reformatting the disk as the number of overflows change. This patent is incorporated herein by reference.

Figure 2:
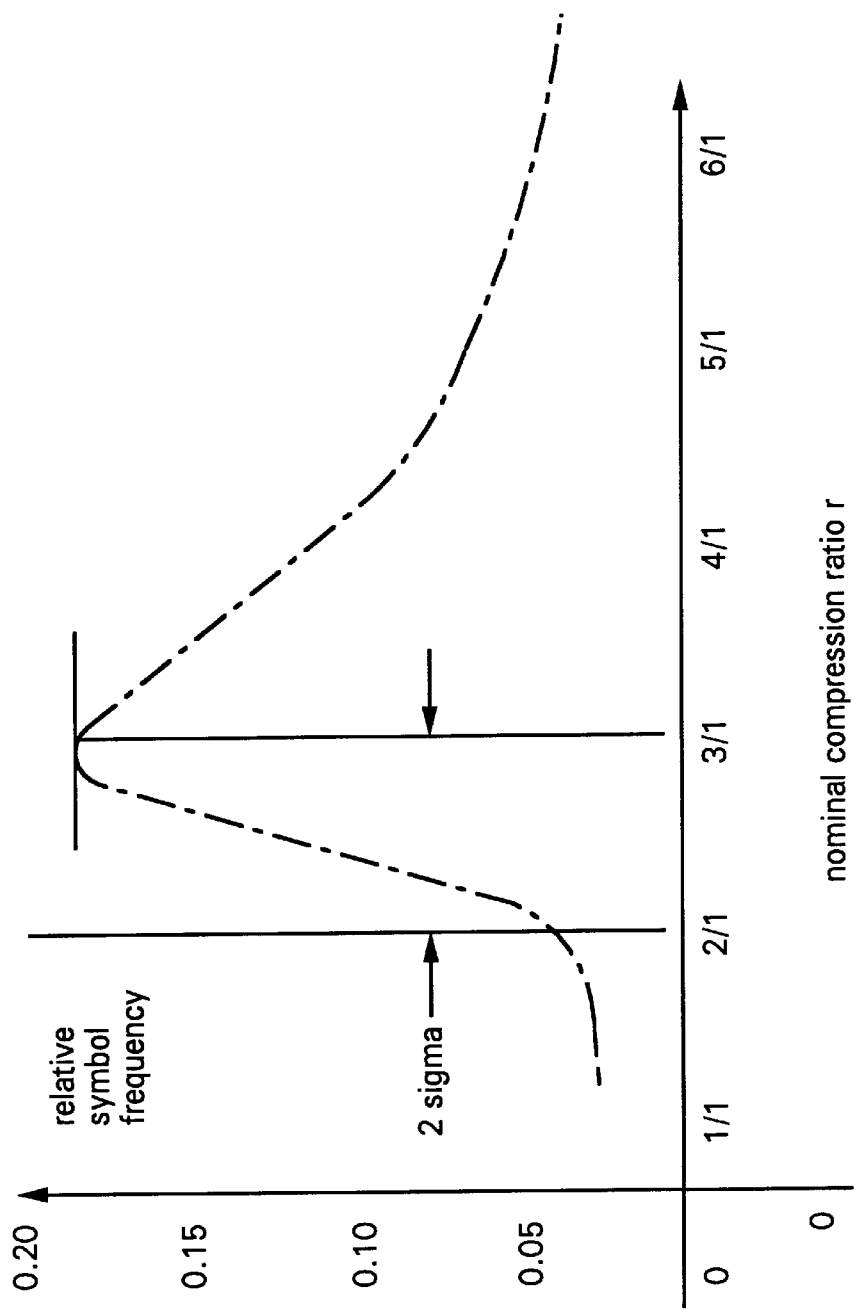
FIG. 2 depicts a symbol probability distribution from an alphanumeric symbol source superimposed onto an ordered set of compression ratios according to the prior art.

Referring now to FIG. 2, there is shown a symbol probability distribution from an information source superimposed onto an ordered set of compression ratios. These symbol probabilities are derived from the relative symbol frequency distribution of any well-known Markovian information source. This distribution is technically termed a "global 0 order Gaussian or Laplacian probability distribution of occurrence for English language text symbols". Such a global distribution exhibits a characteristic skewed, Bell-shaped curve as a function of its standard deviation. This curve has been superimposed on a partial ordering of compression ratios such that the symbols have a probability of occurrence to one or more standard deviations from the mean in the lower tail. This distribution for English coincides with a positive compression ratio.

Significantly, conservative designs would use the lower range of nominal compression ratios r such as from 1.5/1–4.0/1. This determines the size of locations in a memory storing compressed images of fixed-length symbol strings. For instance, a memory of 10,000-byte capacity would use 500 locations to store 500 symbol strings of 20 bytes each. If a nominal compression ratio r=1.5/1, then the location length L=20/r=20/1.5=14 bytes. The maximum number of compressed image locations is restricted to 10,000/14=714. On the other hand, if the now all-compression ratio r=4.0/1, then the location length L=20/4.0=5 bytes. In this case, the number of image locations increases to 10,000/5=2000.

Another critical design parameter according to the invention is the use of a population estimate as to what percentage p of randomly occurring symbol strings is compressible at the nominal compression ratio r to fall within the given location size. For example, if the nominal compression ratio r=3.5/1, then each compression image must fit into L=20/3.5=6 bytes. Suppose the initial estimate is that p=60 percent of the randomly occurring symbol strings are compressible to fit within six bytes. It should also be recalled that the method of the invention requires that the memory be partitioned into the compression area and uncompressed area proportional to the percentage p. Thus, the number of compressible image locations $N_1$=[(10,000) (3.5)/6]0.60= 3500, while the number of uncompressed symbol string locations $N_2$=[(10,000)/20]0.40=200. The memory capacity would be calculated as [(10,000) (3.5)]0.6+[10,000]0.4=26, 800 bytes. The effective compression ratio equals 26,800/10,000=2.68/1.

Given a persistent run of symbol strings or update writes that are successfully compressed and written into the compression area, it is likely that the percentage estimate p=60 percent is too low and should be revised upward. In this case, the method of the invention contemplates that in the event of the observed run that the percentage p be either increased or decreased by a predetermined amount, such as 10 percent.

In this scenario, the new estimate p=60 percent+10 percent=70 percent. The memory capacity would be calculated as [(10,000) (3.5)]0.7+[(10,000)]0.3=27,500 bytes. The effective compression ratio equals 27,500/10,000=2.75/1. Also, the number of compressed image locations $N_1$= [(10,000) (3.5)/6]0.7=4084 in the number of uncompressed symbol string locations $N_2$=[10,000/20]0.3=150. The results of a 10 percent increase or decrease are shown in the following table.

| Nominal Compression Ratio | Percentage of Random Symbol Strings Writable Into Compression Locations | Capacity of 10K Byte Memory Under Partial Compression | Effective Compression Ratio | Number of Compression Locations | Number of Uncompressed Symbol String Locations $N_2$ of 20 Bytes/String |
|---|---|---|---|---|---|
| | | | $N_1$ at 6 Bytes/String | | |
| 3.5/1 | 70% | 27,500 | 2.75/1 | 4085 | 150 |
| 3.5/1 | 60% | 26,800 | 2.68/1 | 3500 | 200 |
| 3.5/1 | 50% | 22,250 | 2.23/1 | 2916 | 250 |
| | | | $N_1$ at 5 Bytes/String | | |
| 4.0/1 | 90% | 37,000 | 3.7/1 | 7200 | 50 |
| 4.0/1 | 80% | 34,000 | 3.4/1 | 6400 | 100 |
| 4.0/1 | 60% | 28,000 | 2.8/1 | 4800 | 200 |

Figure 3:
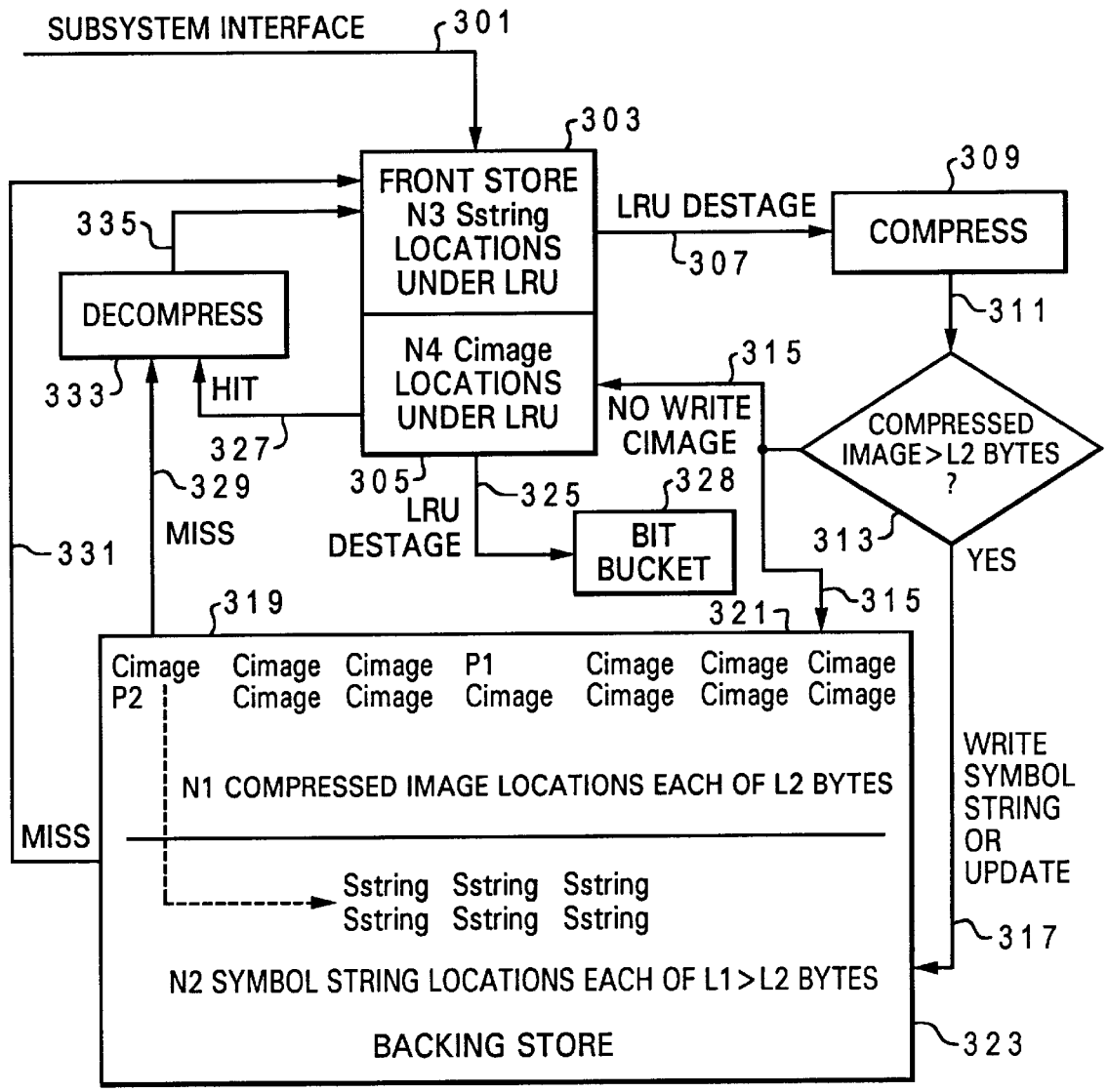
FIG. 3 sets out a compression management flow of control as applied in a hierarchical storage subsystem environment.

Referring now to FIG. 3, there is shown a compression management flow of control of the method of this invention as applied to a hierarchical storage subsystem embodiment. As previously mentioned, the hierarchical storage subsystem comprises a front store formed from an LRU cache of high-speed electronic memory and a back store formed from a slow speed/high volume, such as high-capacity DASDs. Contemporary front stores in such systems as the IBM 3990/3390 comprise random access memory of 50 to 100 gigabyte capacities. The backing store comprises DASDs having several fold that capacity.

In this embodiment, symbol strings are applied from an information source to the subsystem interface 301 and are written into ones of the $N_3$ fixed-length, uncompressed symbol string locations 303. These $N_3$ locations operate under a least recently used (LRU) destaging discipline. This means that once the $N_3$ locations have been filled, then one or more of the oldest symbol strings must be destaged. Any symbol strings on the LRU destaging path 307 are applied to a compression facility 309. This facility may be implemented in any one of the number of standard compression coding forms such as Huffman compression or a form of dictionary compression employing the Liv-Zempel LZ77 or LZ78 algorithms. In this regard, reference should be made to Eastman et al., U.S. Pat. No. 4,464,650, "Apparatus and Method for Compressing Data Signals and Restoring the Compressed Data Signals", issued Aug. 7, 1984.

Referring again to FIG. 3, the output of the compression facility 309 is tested as to whether the compressed image is small enough to fit into the $N_4$ locations 305 in the front store. If it is small enough, then the compressed image of the symbol strings is written into one of the $N_4$ locations and a copy is written into the compressed area 321 holding $N_1$ locations of compressed images. The locations in the compressed portion 305 of the front store also operate under an LRU discipline.

If the compressed image output from the compression facility 309 is the size exceeding the $L_2$ bytes, then the uncompressed version of the symbol strings is directly written into an uncompressed area 323 of the backing store 319 over path 317. Relatedly, a token $P_1$ or $P_2$ is embedded in those locations in the compressed area 321 of the back store where they would have been written otherwise. This token points to the location in the uncompressed area 323 of the backing store where the symbol string has the record. On the other hand, if a compressed image is written into the compression area 305 of the front store, then it may be necessary to destage one or more compression images from the front store area 305 to a bit bucket 328 under an LRU discipline. The reason why a copy of the compressed image written to the $N_4$ locations of the front store is also written to the $N_1$ locations in the backing store is that it allows the destage of compressed images from the compressed area 305 of the front store to be overwritten without loss to the system.

Operationally, when a request is applied to the storage subsystem, the location of the requested symbol string is obtained from a directory (not shown). If a symbol string is located in any other portion of the subsystem, it must be staged up from its remote location to one of the locations in the uncompressed area 303 of the front store. Consequently, any staging from a compressed area 305 of the front store or 341 of the backing store requires that it be passed through a decompression facility 333. Parenthetically, staging up from compressed area 321 of the backing store is accomplished over path 329 to the decompression facility 333, while staging up from compression area 305 of the front store is over path 327 to the decompression facility 333. Staging of symbol strings located in the uncompressed area 323 of the backing store is over path 331.

Implementation of the step revising the estimate of the number of compressible images of symbol strings and then proportionally adjusting the relative number of locations in the $N_1$ and $N_2$ regions requires that the write requests be tracked over time and the storage be reformatted accordingly. This is facilitated by the use of counters and the subsystem clock. If, as previously discussed, a persistent run of symbol strings or updates is written to the $N_2$ locations, then the estimate should be decreased by 10 percent, and the number of $N_2$ locations increased and $N_1$ locations decreased. If a persistent run of compression images is written to $N_1$ locations, then the estimate should be increased by 10 percent, and the number of $N_1$ locations increased and the number of $N_2$ locations decreased.

A control code embodying this invention can be locally stored either in a device controller local memory or at the array controller level for DASD RAID configurations. The actual code rendition is believed well within the grasp of the skilled artisan and is not replicated here. It nevertheless would be expected to include standard software constructs such as monitors for tracking write requests, the formation of estimates, and scheduling the reformatting of a storage device or portion thereto proportionally conforming the sizes and number of locations of the compressed and uncompressed areas to any revised estimate.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method for managing writing in place in a linear address space mapped memory, comprising the steps of:
   (A) partitioning the memory into compressed and uncompressed areas;
   (B) responsive to each fixed-length symbol string which is received for storage in the memory, determining a compressed image and compressed image length for the symbol string and either
      (1) writing the compressed image to a location in the compressed area if the compressed image length is not greater than a location length of locations in the compressed area, or
      (2) writing the symbol string to a location in the uncompressed area and embedding a token in the compressed area pointing to the location of the symbol string in the uncompressed area;
   (C) estimating a percentage of symbol strings that are compressible to a compressed image recordable into the locations in the compressed area; and
   (D) periodically revising the estimate upward or downward if a number of writes of either the symbol strings to the uncompressed area or the compressed images to the compressed area exceeds a predetermined limit and adjusting the partition to alter a relative number of locations in the compressed and uncompressed areas proportionally to the revised estimate.

2. A method for managing writing symbol strings of fixed-length $L_1$ and their updates as compressed images of length $L_2 < L_1$ into a bounded address space mapped onto a storage subsystem, comprising the steps of:
   (A) estimating a percentage p of compressed images of length $L_2' \leq L_2$ under a nominal compression ratio r for a predetermined compression modality taken over a given symbol set, and defining, proportional to p, $N_1$ equal-size locations of length $L_2 = L_1/r$ and $N_2$ equal-size locations of length $L_1$;
   (B) writing compressed images of symbol strings or their updates in the event that their compression length $L_2' \leq L_2$ to ones of the $N_1$ locations, and otherwise embedding tokens in the address space of the $N_1$ locations pointing to counterpart locations for the symbol strings or their updates written to the $N_2$ locations; and
   (C) revising the estimate of p and readjusting the relative number of the $N_1$ and $N_2$ locations proportional to the revised estimate by:
      (1) revising the estimate of p upward by a predetermined percentage responsive to a run of symbol strings or updates written to the $N_2$ locations exceeding a first predetermined limit, and proportionally increasing the number of $N_2$ locations and, decreasing the number of $N_1$ locations; and
      (2) revising the estimate of p downward by a predetermined percentage responsive to a run of compressed images written to the $N_1$ locations exceeding a second predetermined limit, and proportionally decreasing the number of $N_2$ locations, and increasing the number of $N_1$ locations.

3. The method according to claim 2, wherein the step of embedding a token in the address space includes embedding a token in that one of the $N_1$ locations where the compressed image would have been written.

4. The method according to claim 2, wherein the step of readjusting the relative number of the $N_1$ and $N_2$ locations proportional to the revised estimate is one selected from the set of steps consisting of adjusting the relative number of locations within a bounded linear address space and increasing the size of the address space.

5. The method according to claim 2, wherein the step of readjusting the relative number of the $N_1$ and $N_2$ locations proportional to a downward revision in the estimate includes the step of causing a decrease in an effective compression ratio, notwithstanding the fact that the nominal ratio r remains invariant.

6. The method according to claim 2, wherein the step of readjusting the relative number of the $N_1$ and $N_2$ locations proportional to an upward revision in the estimate includes the step of causing an increase in an effective compression ratio, notwithstanding the fact that the nominal ratio r remains invariant.

7. The method according to claim 2, wherein said subsystem is one selected from the set consisting of a random access memory device, a direct access storage device, and a hierarchical storage subsystem of the type in which staging and destaging are governed according to a recency of usage discipline.

8. The method according to claim 7, wherein the recency of usage discipline is one selected from the set consisting of least recently used (LRU) and least frequently used (LFU) disciplines.

9. A method for managing the writing and updating of symbol strings of length $L_1$ and their compressed images of length $L_2 < L_1$ in a bounded logical address space mapped onto a storage subsystem, the subsystem having a front store in which symbol strings or their updates are recorded on a predetermined recency of usage basis, a backing store, and an arrangement responsive to external read and write requests for symbol strings or their updates which are not available for staging images of the requested symbol strings or their updates from the backing store to the front store, the method comprising the steps of:
   (A) estimating a percentage p of compressible images of length $L_2' \leq L_2$ under nominal compression ratio r, and, proportional to p, defining $N_1$ equal-size locations on the backing store of length $L_2 = L_1/r$, and $N_2$ equal-size locations on the backing store of length $L_1$, r being a nominal compression ratio for a predetermined compression modality taken over a given symbol set, and defining $N_3$ and $N_4$ locations on said front store for recording respectively symbol strings of length $L_1$ and compressed images of length $L_2' \leq L_2$;
   (B) writing symbol strings or their updates of length $L_1$ into ones of the $N_3$ locations and writing compressed images of length $L_2' \leq L_2$ into ones of the $N_4$ locations of the front store, respectively, and maintaining the contents of the $N_3$ and $N_4$ locations under a predetermined recency of usage discipline;
   (C) writing compressed images as destaged from ones of $N_4$ locations from the front store under the recency of usage discipline into ones of the $N_1$ locations of the backing store, and writing symbol strings or their updates from ones of $N_3$ locations from the front store under the recency of usage discipline into ones of the $N_2$ locations of the backing store and embedding tokens in the backing store in selected ones of $N_1$ locations pointing to counterpart $N_2$ locations; and (D) revising the estimate of p and readjusting the relative number of the $N_1$ locations in the backing store proportional to the revised estimate by:
  (1) revising the estimate p upward by a predetermined percentage responsive to a run of symbol strings or updates written to the $N_2$ locations exceeding a first predetermined limit, proportionally increasing the number of $N_2$ locations and decreasing the number of $N_1$ locations; and
  (2) revising the estimate of p downward by a predetermined percentage responsive to a run of compressed images written to the $N_1$ locations exceeding a second predetermined limit, proportionally decreasing the number of $N_2$ locations, proportionally increasing the number of $N_2$ locations, and decreasing the number of $N_1$ locations.

10. The method according to claim 9, wherein the recency of usage discipline is one selected from a set consisting of least recently used (LRU) and least frequently used (LFU) disciplines.

11. In a storage subsystem comprising a recording medium and an arrangement responsive to external read and write requests for writing in place symbol strings of fixed-length $L_1$ and their updates as compressed images of length $L_2 < L_1$ in a bounded logical address space as mapped onto the recording medium, the arrangement further comprising:
  (A) a processor for estimating a percentage p of compressible images of length $L_2' \leq L_2$ under nominal compression ratio r fro a predetermined compression modality taken over a given symbol set, and proportional to p, for defining $N_1$ equal-size locations on the medium of length $L_2 = L_1/r$ and $N_2$ equal-size locations on the medium of length $L_1$;
  (B) a writing path responsive to said processor and to the symbol strings or their updates for recording compressed images of symbol strings or their updates in the event that their compression length $L_2' \leq L_2$ ones of the $N_1$ locations, otherwise for recording symbol strings or their updates into ones of the $N_2$ locations and for embedding tokens in the address space pointing to their counterpart locations for the symbol strings or their updates written to the $N_2$ locations; and
  (C) said processor including logic for revising the estimate of p and for readjusting the relative number of the $N_1$ and $N_2$ locations proportional to the revised estimate, said logic:
    (1) revising the estimate p upward by a predetermined percentage responsive to a run of symbol strings or updates written to the $N_2$ locations exceeding a first predetermined limit, proportionally increasing the number of the $N_2$ locations, and decreasing the number of $N_1$ locations; and
    (2) revising the estimate of p downward by a predetermined percentage responsive to a run of compressed images written to the $N_1$ locations exceeding a second predetermined limit, proportionally decreasing the number of $N_2$ locations, and increasing the number of $N_1$ locations.

12. The arrangement according to claim 11, wherein the recording medium is one selected from a set consisting of a random access memory device and a direct access storage device.

13. In a subsystem having a front store in which symbol strings or their updates are recorded on a predetermined recency of usage basis, a backing store, and an arrangement for managing the writing and updating of symbol strings of length $L_1$ and their compressed images of length $L_2 < L_1$ in a bounded address space as mapped onto the front and backing stores, the arrangement being responsive to external read and write requests for accessing requested symbol strings or their updates from the front store, and if the requested symbol strings or their updates are not available, staging their image from the backing store to the front store, arrangement comprising:
  (A) a processor for estimating a percentage p of compressible images of length $L_2' \leq L_2$ under nominal compression ratio r, and proportional to p, for defining $N_1$ equal-size locations of length $L_2 = L_1/r$ and $N_2$ equal-size locations of length $L_1$ both on the backing store, r being a nominal compression ratio for a predetermined compression modality taken over a given symbol set, and for defining $N_3$ and $N_4$ locations on the front store for recording respectively symbol strings of length $L_1$ and compressed images of length $L_2' \leq L_2$;
  (B) a writing path responsive to the processor for recording symbol strings or their updates of length $L_1$ and with compressed images of length $L_2' \leq L_2$ into respective ones of the $N_3$ and $N_4$ locations of front store and for maintaining them under predetermined recency of usage discipline, for recording compressed images of length $L_2' \leq L_2$ as destaged from ones of $N_4$ locations from the front store under the recency of usage discipline into ones of the $N_1$ locations of the backing store, and for recording symbol strings or their updates from ones of $N_3$ locations from the front store under the recency of usage discipline into ones of the $N_2$ locations of the backing store, and for embedding tokens in the backing store in selected ones of $N_1$ locations pointing to counterpart $N_2$ locations; and
  (C) the processor including logic for revising the estimate of p and for readjusting the relative number of the $N_1$ and $N_2$ locations in the backing store proportional to the revised estimate, the logic (1) revising the estimate p upward by a predetermined percentage responsive to a run of symbol strings or updates written to the $N_2$ locations exceeding a first limit, proportionally increasing the number of $N_2$ locations, and decreasing the number of $N_1$ locations; and (2) revising the estimate of p downward by a predetermined percentage responsive to a run of compressed images written to the $N_1$ locations exceeding a second limit, proportionally decreasing the number of $N_2$ locations, and increasing the number of $N_1$ locations.

14. The subsystem according to claim 13, wherein the recency of usage discipline is one selected from the set consisting of least recently used (LRU) and least frequently used (LFU) disciplines.

15. An article of manufacture comprising a machine-readable memory having stored therein indicia of a plurality of processor-executable control program steps for managing the writing in place of symbol strings of fixed-length $L_1$ and their updates as compressed images of length $L_2 < L_1$ into a bounded address space as mapped onto a storage subsystem, the plurality of indicia of control program steps include:
  (A) indicia of control program step for estimating a percentage p of compressible images of length $L_2' \leq L_2$ under a nominal compression ratio r for a predetermined compression modality taken over a given symbol set, and, proportional to p, defining $N_1$ equal-size locations of length $L_2 = L_1/r$ and $N_2$ equal-size locations of length $L_1$, where r is the nominal compression ratio;
  (B) indicia of control program step for writing compressed images of symbol strings or their updates in the event that their compression length $L_2' \leq L_2$ to ones of the $N_1$ locations, otherwise writing symbol strings or their updates to ones of the $N_2$ locations and embedding tokens in the address space pointing to the counterpart locations for the symbol strings or their updates written to the $N_2$ locations; and (C) indicia of a control program step for revising the estimate of p and readjusting the relative number of the $N_1$ and $N_2$ locations proportional to the revised estimate by (1) revising the estimate of p upward by a predetermined percentage responsive to a persistent run of symbol strings or updates written to the $N_2$ locations exceeding a first limit, proportionally increasing the number of $N_2$ locations, and decreasing the number of $N_1$ locations; and (2) revising the estimate of p downward by a predetermined percentage responsive to a persistent run of compressed images written to the $N_1$ locations exceeding a second limit, proportionally decreasing the number of $N_2$ locations, and increasing the number of $N_1$ locations.

* * * * *